US012726663B1

(12) United States Patent
Mirzeinolabedin

(10) Patent No.: US 12,726,663 B1
(45) Date of Patent: Sep. 1, 2026

(54) SYSTEM AND METHOD OF REAL TIME TRANSCODING FOR LIVE STREAMING AND DELIVERY NETWORK

(71) Applicant: Reza Mirzeinolabedin, Richmond Hills (CA)

(72) Inventor: Reza Mirzeinolabedin, Richmond Hills (CA)

( * ) Notice: Subject to any disclaimer, the term of this patent is extended or adjusted under 35 U.S.C. 154(b) by 0 days.

(21) Appl. No.: 19/242,118

(22) Filed: Jun. 18, 2025

(51) Int. Cl.
*H04N 21/2343* (2011.01)
*H04N 21/2187* (2011.01)
*H04N 21/2387* (2011.01)

(52) U.S. Cl.
CPC . *H04N 21/234336* (2013.01); *H04N 21/2187* (2013.01); *H04N 21/2387* (2013.01)

(58) Field of Classification Search
None
See application file for complete search history.

(56) References Cited

U.S. PATENT DOCUMENTS

2022/0264168 A1* 8/2022 Dahl .................... H04L 65/612
2025/0380026 A1* 12/2025 Greer ................ H04N 21/4331
2026/0006269 A1* 1/2026 Chen ............... H04N 21/23655

* cited by examiner

*Primary Examiner* — Junior O Mendoza
(74) *Attorney, Agent, or Firm* — Gulf Coast Intellectual Property Group

(57) ABSTRACT

The present invention is a technique to simultaneously transcode all the live stream ladder renditions and make them accessible using a pipeline design pattern. The software application of the present invention encodes all the variants of video content in real-time while the live stream source is being transmitted producing all the variants in real-time to reduce the playout latency. The primary novelty of the present invention transcodes all the renditions in the encoding ladder simultaneously and a utilizes a protocol that delivers the transcoded DASH/HLS segments along the DASH/HLS manifest from the ingest server to the WEB servers. In this system, there are at least three types of servers involved which include ingest servers that are the edge connection with streams, directory servers that keep track of available streams and WEB servers that serve DASH/HLS segments to the clients.

3 Claims, 4 Drawing Sheets

| **Field Name** | **Description** |
| --- | --- |
| stream_index | The index of the internal stream in the live stream |
| media_type | Determines audio, video, subtitle… |
| stream_name | The transcoded output stream name |
| bitrate | The transcoded output bitrate |
| width | The transcoded output width |
| height | The transcoded output height |
| codecs | The codecs specs in the manifest |
| encoder | The encoder to be used or transcoding the ladder entry |

Fig. 2

SYSTEM AND METHOD OF REAL TIME TRANSCODING FOR LIVE STREAMING AND DELIVERY NETWORK

FIELD OF THE INVENTION

The present invention relates generally to content live streaming more specifically but not by way of limitation, the present invention relates to the real-time transcoding of the live streams and stored video content utilizing simultaneous transcoding all bitrates in the encoding ladder specification having a plurality of entries that employs a protocol that delivers the transcoded dynamic adaptive streaming/HTTP live streaming segments (DASH/HLS) segments along the DASH/HLS manifest from an ingest server to the clients or servers to significantly reduce playback latency.

BACKGROUND

In the rapidly evolving digital age, live streaming has emerged as a dominant mode of content delivery, serving a wide array of industries including entertainment, education, and corporate communications. However, as demand for higher quality and more responsive streaming experiences grows, so too does the need to address the technical limitations that impede optimal performance. One significant bottleneck in current live streaming architectures is the latency introduced by just-in-time transcoding. Just-in-time transcoding operates on a reactive model wherein video content is transcoded or encoded into a required variant only upon receiving a specific user request. While this method offers resource optimization, only processing what is necessary it inherently introduces latency. When a new variant is requested, the system must first process and encode the requested stream before it can be delivered to the end user. This delay, though perhaps measured in seconds, can be detrimental in contexts where real-time interaction is critical, such as live sports, gaming, or emergency broadcasts. Moreover, the cumulative effect of such delays across a broad user base can significantly degrade perceived performance and viewer satisfaction.

The limitations of just-in-time transcoding are further magnified under conditions of high viewer concurrency or when viewers request a wide diversity of resolutions and bitrates. Each new request requires computational resources to be diverted to transcoding tasks, often leading to bottlenecks and further latency. In addition, the unpredictability of viewer behavior makes it challenging to efficiently pre-cache likely variants, resulting in increased strain on servers and potential streaming interruptions. In contrast, a real-time transcoding methodology presents a compelling solution to these challenges. By proactively transcoding all necessary variants of a video stream in real-time as the source content is being ingested, this approach eliminates the latency associated with on-demand processing. Viewers can immediately access their desired resolution or format without triggering a processing delay, thereby significantly reducing startup times and buffering events. This method ensures a more seamless and engaging user experience, especially for latency-sensitive applications.

Beyond user experience, real-time transcoding offers operational advantages. It allows for better load balancing and resource allocation, as the encoding tasks are distributed evenly over time rather than clustered around user requests. Additionally, by generating all variants in advance, content delivery networks can more efficiently cache and distribute content, reducing the load on origin servers and improving scalability. However, the transition to real-time transcoding is not without its own technical and economic challenges. The approach demands considerable computational resources and efficient encoding algorithms capable of keeping pace with the live stream. Energy consumption and infrastructure costs are also potential concerns, particularly for large-scale providers. Nonetheless, advancements in hardware acceleration, parallel processing, and adaptive bitrate streaming are steadily mitigating these concerns, making real-time transcoding a more viable option.

While just-in-time transcoding has served the industry well by optimizing resource use, its latency drawbacks are increasingly at odds with the real-time expectations of modern audiences. The development and deployment of real-time transcoding methodologies promise to redefine the live streaming landscape, offering a more responsive, scalable, and user-friendly solution. As technology continues to evolve, the pursuit of low-latency, high-quality streaming experiences will necessitate a shift from reactive to proactive encoding strategies Accordingly, there is a need for a transcoding software application that performs real-time transcoding of the live streams and stored video content utilizing simultaneous transcoding all bitrates in the encoding ladder specification having a plurality of entries that employs a protocol that delivers the transcoded dynamic adaptive streaming/HTTP live streaming segments (DASH/HLS) segments along the DASH/HLS manifest from an ingest server to the clients or servers to significantly reduce playback latency.

SUMMARY OF THE INVENTION

It is the object of the present invention to provide a real-time transcoding of the live streams and production and distribution of DASH/HLS segments in real-time wherein the present invention simultaneously transcodes all the live stream ladder renditions and so as to make accessible using a pipeline design pattern.

A further object of the present invention is to provide a real-time transcoding of the live streams and production and distribution of DASH/HLS segments in real-time wherein the present invention provides a hierarchical distributed system capable of handling live streaming events with low latency, high scalability, and performance.

Yet a further object of the present invention is to provide a real-time transcoding of the live streams and production and distribution of DASH/HLS segments in real-time wherein the present invention transcodes all the renditions in the ladder simultaneously and provides a protocol that delivers the transcoded DASH/HLS segments along the DASH/HLS manifest from the ingest server to the WEB servers.

Still another object of the present invention is to provide a real-time transcoding of the live streams and production and distribution of DASH/HLS segments in real-time An additional object of the present invention is to provide a real-time transcoding of the live streams and production and distribution of DASH/HLS segments in real-time wherein the present invention utilizes at least three types of servers.

Yet a further object of the present invention is to provide a real-time transcoding of the live streams and production and distribution of DASH/HLS segments in real-time wherein the server types include an ingest servers that function as the edge connection with streams from content producers and can record and produce DASH/HLS segments and push the result to WEB servers. Additionally, the present invention includes directory servers that keep track of available streams and ingest servers. Furthermore the present invention includes WEB servers that serve DASH/HLS segments to the clients with proper digital rights management (DRM) or ad insertion.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 2 is a table of exemplary fields in each entry in the encoding ladder specification array.

DETAILED DESCRIPTION

Figure 1:
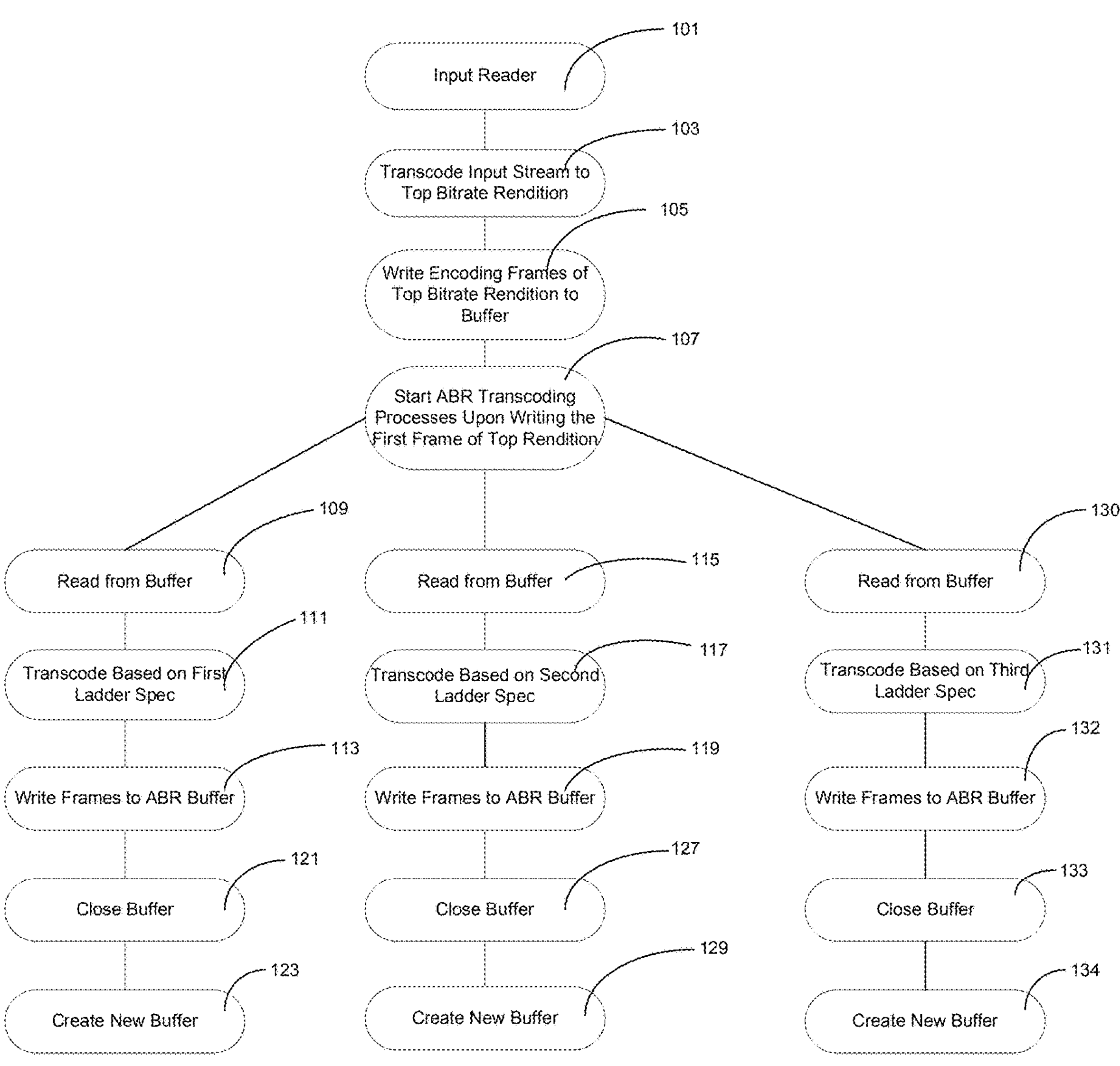
FIG. 1 is a diagram of the process for simultaneous transcoding of all bitrates in an exemplary encoding ladder having three specifications.

Referring now to the drawings submitted herewith, wherein various elements depicted therein are not necessarily drawn to scale and wherein through the views and figures like elements are referenced with identical reference numerals, there is illustrated a method of real time transcoding of live streaming video 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the FIG. 1 submitted herewith the method of real time transcoding of live streaming video 100 is configured to simultaneously transcode all bitrates in the encoding ladder specification having a plurality of entries. As is known in the art, the encoding ladder provides multiple versions of a video for live streaming wherein each version has a different bitrate and resolution and is delivered to a device based on the capabilities of the device. Current technology employed in the field of invention waits for an incoming request and subsequently transcodes or encodes a new variant based on the request. The present invention does not wait for the request. The present invention transcodes all the variants of the live stream content in real-time while the live stream source is being transmitted producing all the variants or renditions in real-time which results in a significant reduction of the playback latency. The novelty of the present invention is utilization of a real time transcoding functionality, which transcodes all the renditions of the live stream video content in the encoding ladder simultaneously and employs a protocol that delivers the transcoded DASH/HLS segments along the DASH/HLS manifest from an ingest server to the client servers operably coupled to the Internet. The method of real time transcoding of live streaming video 100 utilizes three types of servers to execute the workflow of the present invention. A first type of server is an ingest servers wherein the ingest servers are the edge connection with streams from content producers. The ingest servers of the present invention can record and produce DASH/HLS segments and push the result to the web servers. The present invention further employs at least one directory servers, wherein the directory servers maintain track of available streams and ingest servers. Additionally, the present invention has in the workflow thereof at least one web server wherein the web server serves DASH/HLS segments to the clients. It should be understood within the scope of the present invention that the aforementioned servers are conventional computing devices having the necessary electronics to receive, store, transmit and manipulate data.

Referring in particular to FIG. 1 submitted as a part hereof, there is illustrated therein a diagram of the process for simultaneous transcoding of all bitrates in an exemplary encoding ladder having three specifications. It should be understood within the scope of the present invention that the encoding ladder could have more or less than three specifications. In step 101 employing the methodology of the present invention, an input reader reads an input stream immediately as the network packet is available. The method of real time transcoding of live streaming video 100 utilizes an event-based methodology and the input frames are available to a decoder and subsequently to an encoder immediately when the operating system reads a network packet. Step 103, the transcoder of the present invention transcodes the input stream to a top bitrate and resolution rendition. In step 105 the present invention writes new encoding frames of top bitrate rendition into a read-write buffer in memory on a computing device being utilized to operate the method of real time transcoding of live streaming video 100. Step 107, the first frame is written into the read-write memory buffer for the top rendition and will start a transcoding process for each entry in the encoding ladder specification. In step 109, the first transcoding process reads from the read-write buffer utilizing callback functions. In step 111, the method of real time transcoding of live streaming video 100 transcodes the top rendition frames into DASH/HLS frames based on first encoding ladder specification. Step 113 the present invention writes the DASH/HLS frames into the adaptive bitrate (ABR) read-write buffer of the first transcoding process. In step 115, the second transcoding processes of the present invention read from a single read-write buffer stored in step 105. It should be understood that a read-write buffer exists for each encoding ladder specification of the video content. Step 117, the method of real time transcoding of live streaming video 100 transcodes the frames. Step 119, the method of real time transcoding of live streaming video 100 writes the result to a different read-write buffer. When a read-write buffer contains a complete DASH/HLS segment, in step 127 the read-write buffer is closed and subsequently in step 129 a new read-write buffer is created for the ensuing DASH/HLS segment. It should be understood within the scope of the method of real time transcoding of live streaming video 100 that there is one process for each entry in the encoding ladder specification, and these processes continue transcoding until the input stream is halted. The encoding ladder specification is obtained during the stream configuration and is an array of transcoding parameters for a specific rendition. As illustrated in FIG. 1 submitted as a part hereof, it should be understood within the scope of the present invention that steps 109-123, 115-129 and 130-131 are all executed simultaneously with each of the aforementioned groups of steps representing the process for a rendition in the encoding ladder.

FIG. 2 is a table of exemplary fields in each entry in the encoding ladder specification array. In the method of real time transcoding of live streaming video 100 each DASH/HLS segment in the manifest will have a corresponding specification in the encoding ladder specification. This specification determines the transcoding parameters for each DASH/HLS rendition in the manifest. In addition to bitrate, width, and height for the target DASH/HLS segments, the encoding ladder specification includes the encoder for that rendition. This enables the ingest server to use different encoders based on the system's requirements and available resources. By way of example but not limitation, the encoder can be set to NETINT or NVIDIA encoder for faster encoding.

Figure 3:
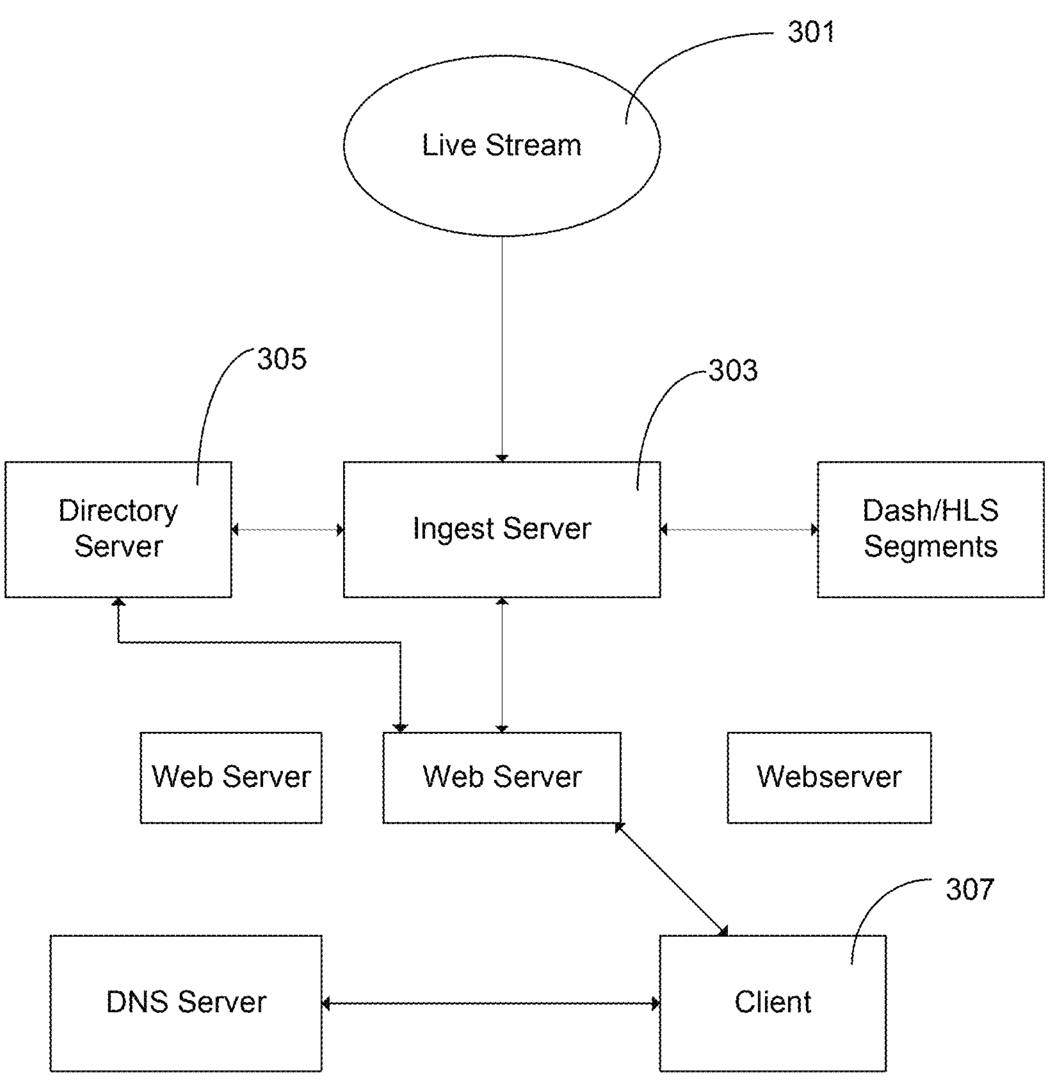
FIG. 3 is an exemplary workflow in a proposed content delivery network.

The present invention is hierarchical distributed system with employing advanced routing of the DASH/HLS transcoded segments and manifests to WEB serving servers via a push pipeline protocol. Referring in particular to FIG. 3 submitted as a part hereof, the diagram illustrated the operation of the present invention. In step 301, the live stream content in various formats such as but not limited to MPEG-TS, SRT or RTMP is transmitted to the ingest server. In step 303, ingest server utilizes the methodology of the present invention to produce DASH/HLS segments along the manifest in the memory cache while the video stream content is being transmitted to the ingest server. Step 305, the ingest server registers incoming live stream in the directory server. In step 307, client contacts the DNS server to identify the closest WEB server with a current minimum load. Ensuing step 307, the client obtains a list of available content to play which can include different live or video on demand streams. The client selects a live stream to play out, initiated by sending a manifest request to the WEB server, followed by requests for DASH/HLS segments for the live stream. Following this action the WEB server utilizes the directory server to identify which ingest server has the live stream and then sends a pipeline request to the ingest server. Next, the ingest server sends all the DASH/HLS segments and manifests of the live video stream via the pipeline to the WEB server. Lastly, The WEB server serves the client watching the live video stream. As previously stated herein, the video content played to the client can be live stream or video on demand.

FIG. 3 illustrates the overall design and sequence of operations of the method of real time transcoding of live streaming video 100 that occurs in the proposed live-streaming content delivery network. The ingest server processes each input stream based on the stream's parameters and renditions in the encoding ladder with the parameters specified in the encoding ladder specification. The ingest node decodes and encodes all the renditions simultaneously while the video stream is being transmitted. The ingest node may decode once and encode multiple times to produce DASH/HLS segments or may decode and encode multiple times simultaneously. In either scenario, the method of real time transcoding of live streaming video 100 encodes and produces DASH/HLS segments simultaneously while the live stream is being transmitted. The encoding results can be stored on a disk or in a memory cache. By way of example but not limitation, if the input stream is 1920×1080, and the encoding ladder renditions are 1920×1080, 1280×720, 960×540, and 640×360, the ingest server encodes all the encoding ladder renditions simultaneously and produces the DASH/HLS segments of the encoding ladder in the following resolutions 1920×1080, 1280×720, 960×540, 640×360 while the video stream is being transmitted. It should be understood within the scope of the present invention that the ingest server could run on cloud-based equipment or a dedicated computer as with the WEB servers. In a hybrid configuration, the ingest server can run on a dedicated machine, and the WEB servers can be configured and run on cloud-based equipment.

Figure 4:
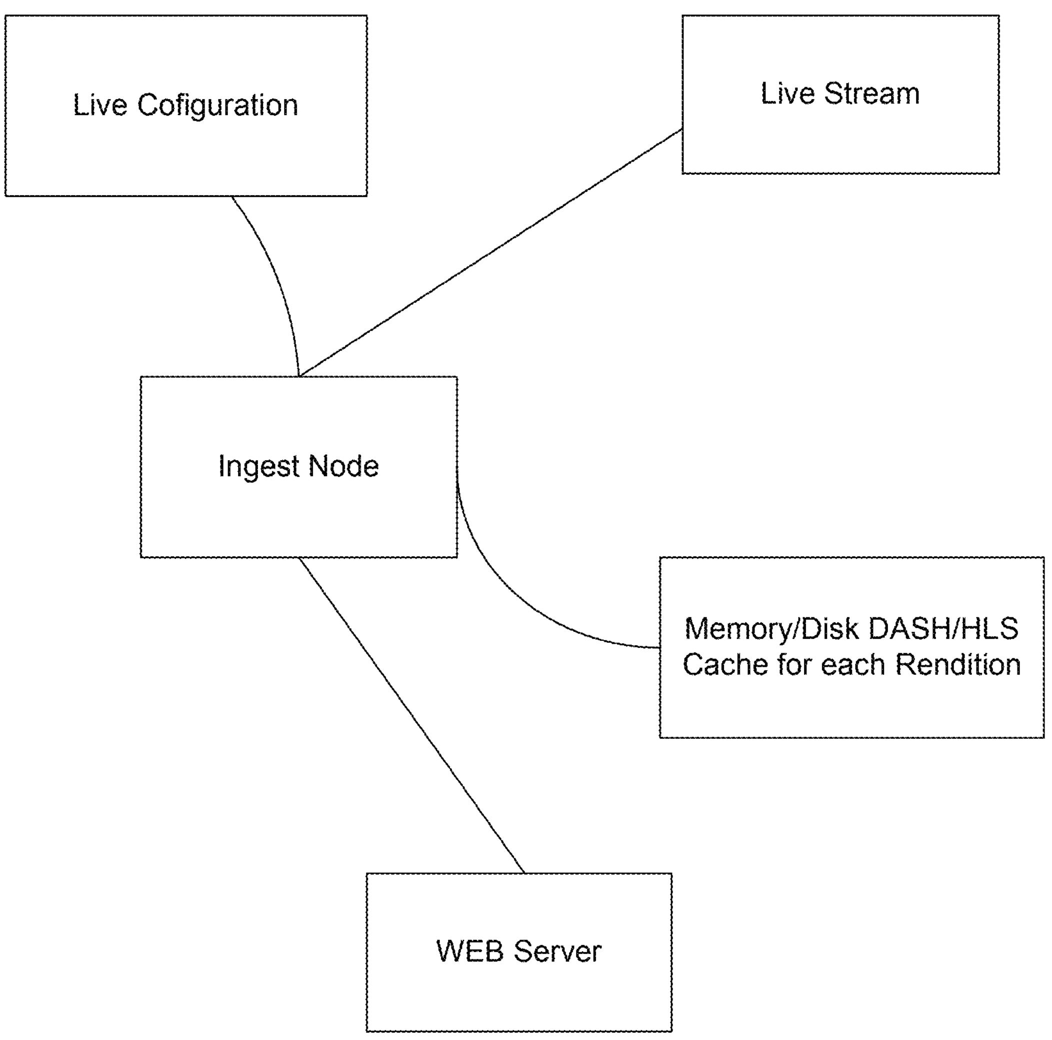
FIG. 4 is a diagram of DASH/HLS segment production utilizing the encoding ladder specification and transmission to a server.

Now referring in particular to FIG. 4, there is illustrated therein in detail how the ingest server records a live stream and creates the DASH/HLS segments for different variants/renditions of the live stream content. The ingest node obtains the live configuration, which includes encoding ladder specification and subsequently produces DASH/HLS segments for all renditions in the encoding ladder simultaneously using the methodology of the present invention. The ingest server keeps a cache of adaptive bit rate segments that are generated for each entry in the encoding ladder specification. This cache can be a circular bounded queue for live streaming that dequeues the oldest entry and inserts a new DASH/HLS adaptive bit rate segment into the queue.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method of real time transcoding all bit rates in an encoding ladder for playback having reduced latency wherein the method comprises the steps of:

providing at least one ingest server, said at least one ingest server having electronics to receive, store, transmit and manipulate data;

providing at least one directory server, said at least one directory server having electronics to receive, store, transmit and manipulate data, said at least one directory server being operably coupled to said at least one ingest server;

providing at least one web server, said at least one web server having electronics to receive, store, transmit and manipulate data, said at least one web server being operably coupled to said at least one ingest server and said at least one directory server;

reading an input stream, wherein the input stream is read immediately as a network packet is available;

transcoding the input stream to a top bitrate and resolution rendition;

writing new encoding frames into a read-write memory buffer, wherein a first frame is written into the read-write memory buffer for top rendition frames;

initiating a transcoding process for each entry in an encoding ladder specification to produce DASH/HLS segments;

reading from the read-write memory buffer utilizing call-back functions;

transcoding the top rendition frames into DASH/HLS frames;

writing the DASH/HLS frames into the second read-write memory buffer;

completing a DASH/HLS segment in the second read-write memory buffer;

closing the second read-write memory buffer;

creating a new read-write memory buffer for an ensuing DASH/HLS segment;

registering an incoming live stream in the at least one directory server;

contacting a DNS server from a client device to identify a WEB server with a minimum load;

providing a list of available content for play to the client device;

selecting content to play from the list of available content;

utilizing the at least one directory server to identify the at least one ingest server having the selected content;

transmitting all of the DASH/HLS segments of the selected content utilizing a pipeline to a WEB server; and serving the client device utilizing the WEB server.

2. The method of real time transcoding all bit rates in an encoding ladder for playback having reduced latency as recited in claim 1, wherein the step of selecting content to play is initiated by transmitting a manifest request to the WEB server.

3. The method of real time transcoding all bit rates in an encoding ladder for playback having reduced latency as recited in claim 2, wherein the step of selecting content to play further includes requesting for DASH/HLS segments for the selected content.

* * * * *